(12) United States Patent
Chang

(10) Patent No.: US 6,766,974 B2
(45) Date of Patent: Jul. 27, 2004

(54) CLICKING REEL SHELL FOR SPINNING REEL

(76) Inventor: Liang-Jen Chang, No. 132, Fu-I Rd., I-Hsin Li, Tai-Ping City, Taichung Hsien (TW)

( * ) Notice: Subject to any disclaimer, the term of this patent is extended or adjusted under 35 U.S.C. 154(b) by 0 days.

(21) Appl. No.: 10/298,278

(22) Filed: Nov. 18, 2002

(65) Prior Publication Data

US 2004/0094647 A1 May 20, 2004

(51) Int. Cl.$^7$ ................................................ A01K 89/91
(52) U.S. Cl. ........................ 242/231; 242/232; 242/233
(58) Field of Search ................................ 242/231, 232, 242/233

(56) References Cited

U.S. PATENT DOCUMENTS

| | | | | |
|---|---|---|---|---|
| 4,824,040 A | * | 4/1989 | Carpenter et al. | 242/233 |
| 5,613,644 A | * | 3/1997 | Karlsson | 242/232 |
| 5,683,049 A | * | 11/1997 | Kawabe et al. | 242/232 |
| 6,050,511 A | * | 4/2000 | Katayama et al. | 242/231 |
| 6,247,663 B1 | * | 6/2001 | Matsuda | 242/231 |
| 6,371,395 B2 | * | 4/2002 | Sato | 242/232 |
| 2002/0148918 A1 | * | 10/2002 | Hirayama et al. | 242/232 |

FOREIGN PATENT DOCUMENTS

| | | |
|---|---|---|
| EP | 1 201 122 A2 | 5/2002 |
| EP | 1 250 841 A1 | 10/2002 |

OTHER PUBLICATIONS

Abstract for JP 2001269093, "Sound Producing Device of Spinning Reel", Takikura Kouji, Mar. 29, 2000, European Patent Office, Patent Abstracts of Japan.

* cited by examiner

*Primary Examiner*—Kathy Matecki
*Assistant Examiner*—Evan Langdon
(74) *Attorney, Agent, or Firm*—Browdy & Neimark, P.L.L.C.

(57) ABSTRACT

A clicking reel shell for a spinning reel includes a base, two support arms extending outwardly from two sides of the base, two bail arms respectively pivotally mounted to the two support arms, and a bail connected with the two bail arms. One of the two bail arms has an elongated recess, and the respective support arm has an inside chamber, which is installed with a swing member having an axle hole at the center thereof, a spring, and a connecting rod. The connecting rod has an end inserted into the axle hole of the swing member and the other end inserted into the elongated recess. Accordingly, when the bail pivots with respect to the base to a predetermined position, the connecting rod will move in the elongated recess and make a clicking sound when impacting one end of the elongated recess.

12 Claims, 15 Drawing Sheets

CLICKING REEL SHELL FOR SPINNING REEL

FIELD OF THE INVENTION

The present invention relates generally to a spinning reel for fishing, and more particularly to a reel shell for the spinning reel, which will make a clicking sound to alert a user while a predetermined position is made, and the predetermined position will be precisely made.

BACKGROUND OF THE INVENTION

Figure 1:
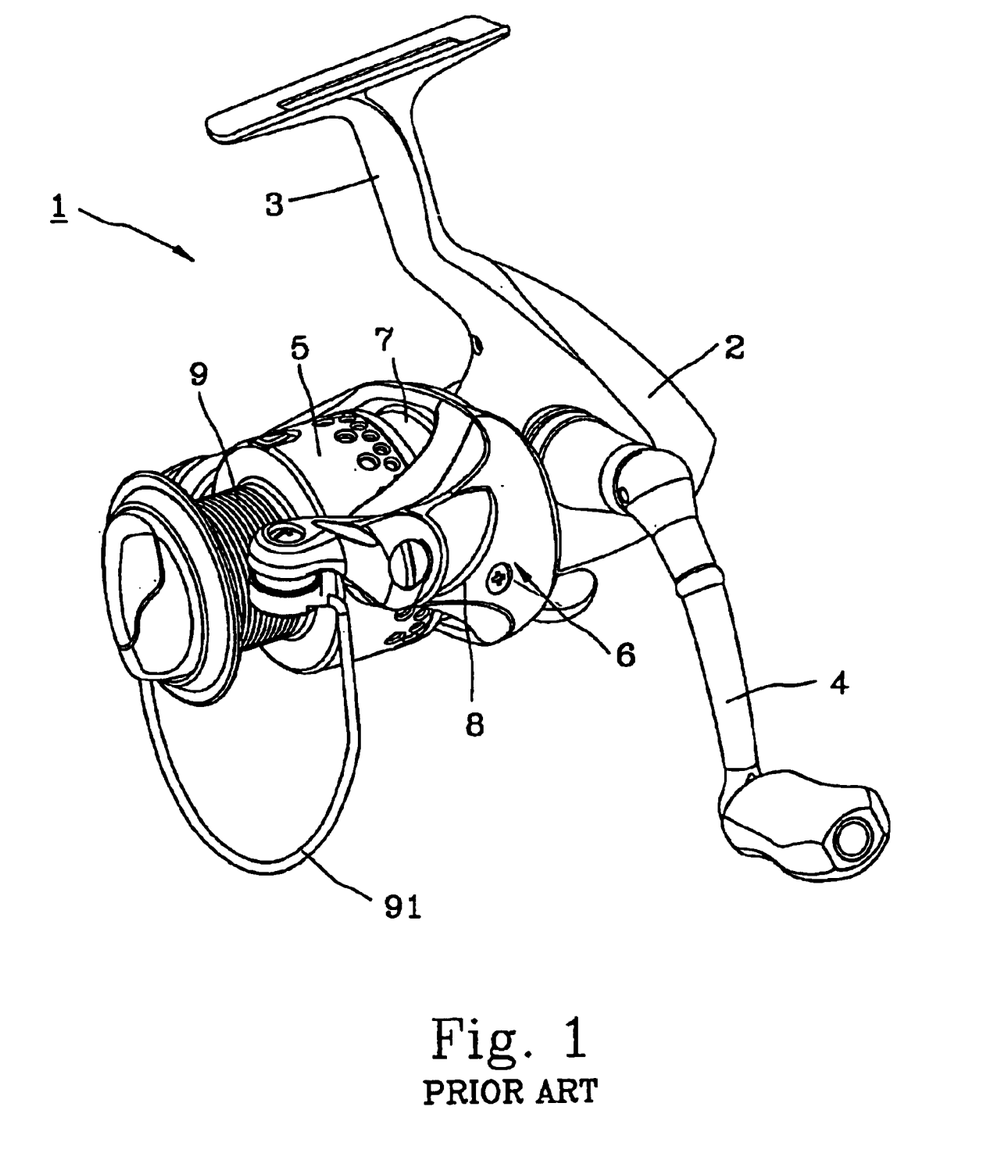
FIG. 1 is a perspective view of a conventional spinning reel.

A conventional spinning reel 1, as shown in FIG. 1, includes a reel body 2, a rod attachment portion 3 extending upwardly from the reel body 2, a crank 4 rotatably mounted on the reel body 2, a spool 5 mounted on a front end of the reel body 2, and a reel shell 6 rotatably mounted on the reel body 2. When a user turns the crank 4, the reel shell 6 will be driven to rotate so as to further actuate the spool to do reciprocating actions for successfully releasing or recovering fishing lines. The reel shell 6 includes a base 7, two support arms 8 extending outwardly from two sides of the reel body 7, two bail arms 9 respectively pivotally connected with the two support arms 8, and a bail 91 having two ends pivotally connected with the two bail arms 9, such that the bail 91 can pivot with respect to the reel body 7 and change its location. Actually, the aforesaid pivoting of the bail 91 is made by the two bail arms 9 pivoting with respect to the two support arms 8. However, while the aforesaid pivoting is made in the conventional spinning reel, an obvious clicking sound is hardly generated such that the user fails to confirm if the foregoing pivoting is done completely or midway. Accordingly, a bail is not precisely positioned such that the conventional spinning reel will work abnormally.

SUMMARY OF THE INVENTION

The primary objective of the present invention is to provide a clicking reel shell for a spinning reel, a bail of which is precisely positioned and meanwhile a clicking sound will be made.

The foregoing objective is attained by a clicking reel shell for a spinning reel, which is rotatably mounted on a reel body of the spinning reel and can be driven to rotate. The reel shell includes a base, a first bail arm, a second bail arm, and a bail. The base is composed of a spool holder connected with the reel body of the spinning reel, a first support arm extending outwardly from a first side of the spool holder, and a second support arm extending outwardly from a second side of the spool holder. The first support arm is provided with a chamber inside and an opening, which communicates with the chamber and outside, at a free end thereof. The first bail arm is pivotally connected with the first support arm at a first end thereof and seals the opening and has an elongated recess at an inner side thereof. The second bail arm is pivotally connected with the second support arm at a first end thereof. The bail has two ends respectively connected with a second end of the first bail arm and a second end of the second bail arm. The chamber of the first support arm of the base is further installed with a swing member, a connecting rod, and a spring therein. The swing member is pivotally connected to the first support arm and is centrally provided with an axle hole, which is provided with a stop portion at an end. The connecting rod is provided with a body portion which is inserted into the axle hole of the swing member, a waist portion positioned at a central section of the body portion, and an arm portion laterally extending outwardly from a distal end of the body portion and being inserted into the elongated recess of the first bail arm. The spring is sleeved onto the body portion of the connecting rod and is positioned in the axle hole of the swing member. The spring has two ends respectively resting against the stop portion and the waist portion of the connecting rod. Accordingly, when the bail pivots with respect to the base to a predetermined position, a clicking sound will be made and the predetermined position is more precisely made.

DETAILED DESCRIPTION OF THE INVENTION

Figure 2:
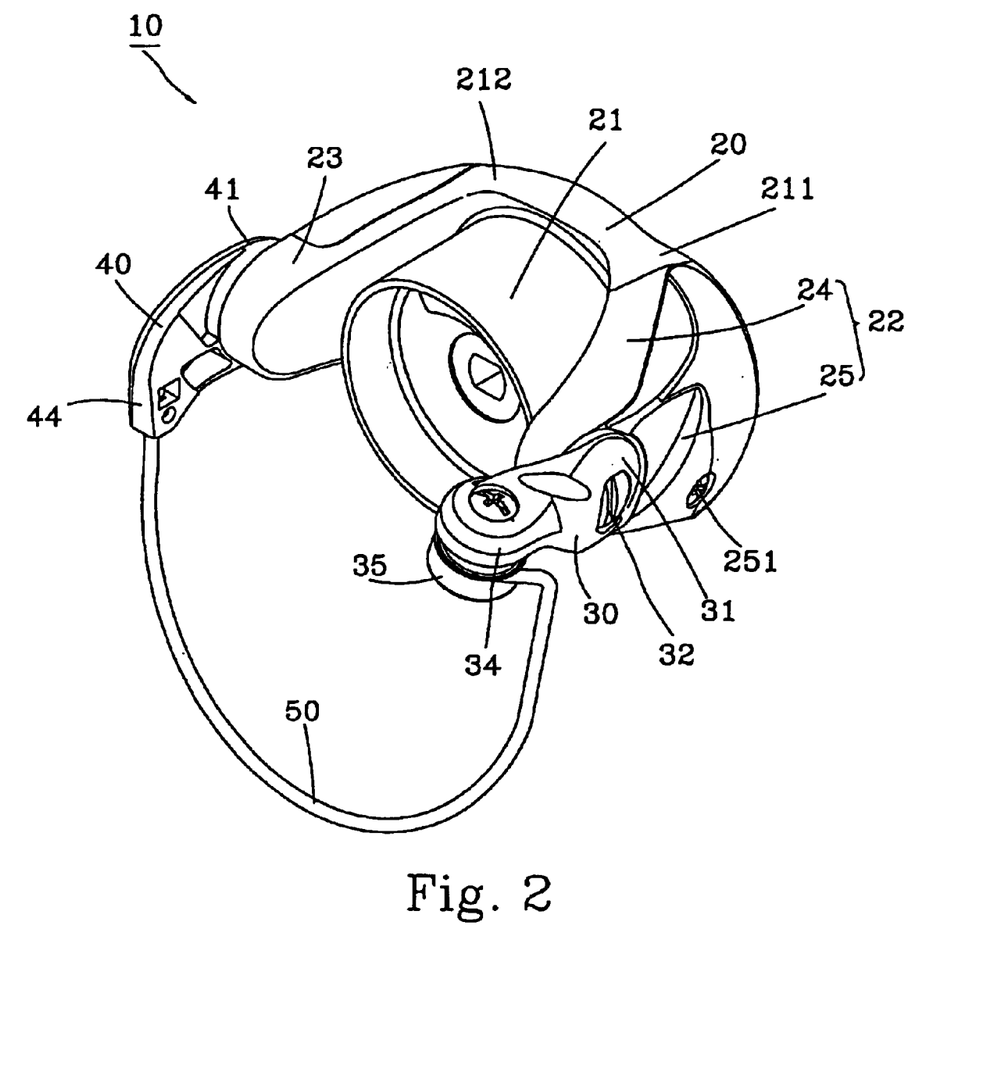
FIG. 2 is a perspective view of a first preferred embodiment in accordance with the present invention.
Figure 3:
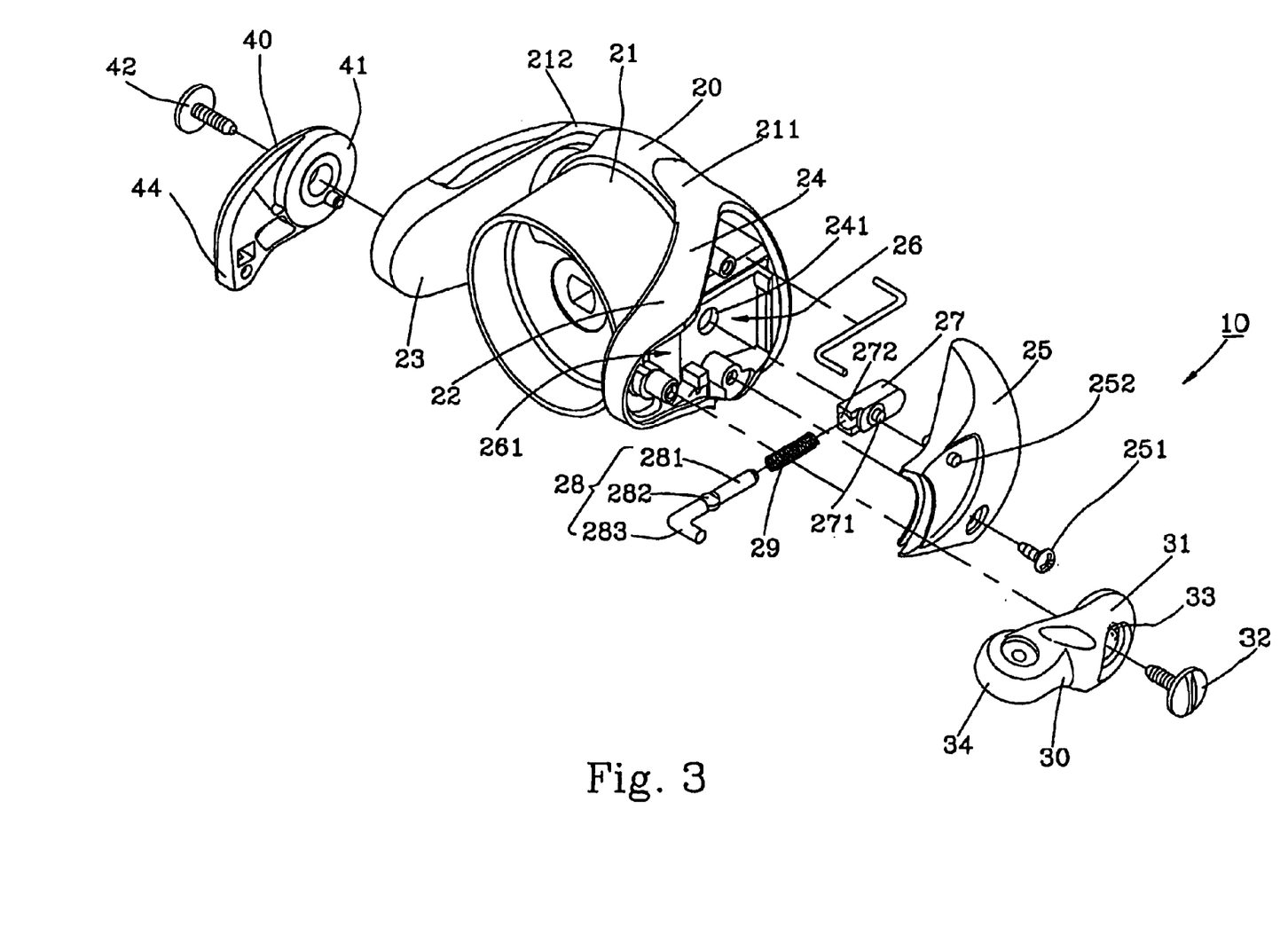
FIG. 3 is an exploded view of the first preferred embodiment of the present invention.
Figure 4:
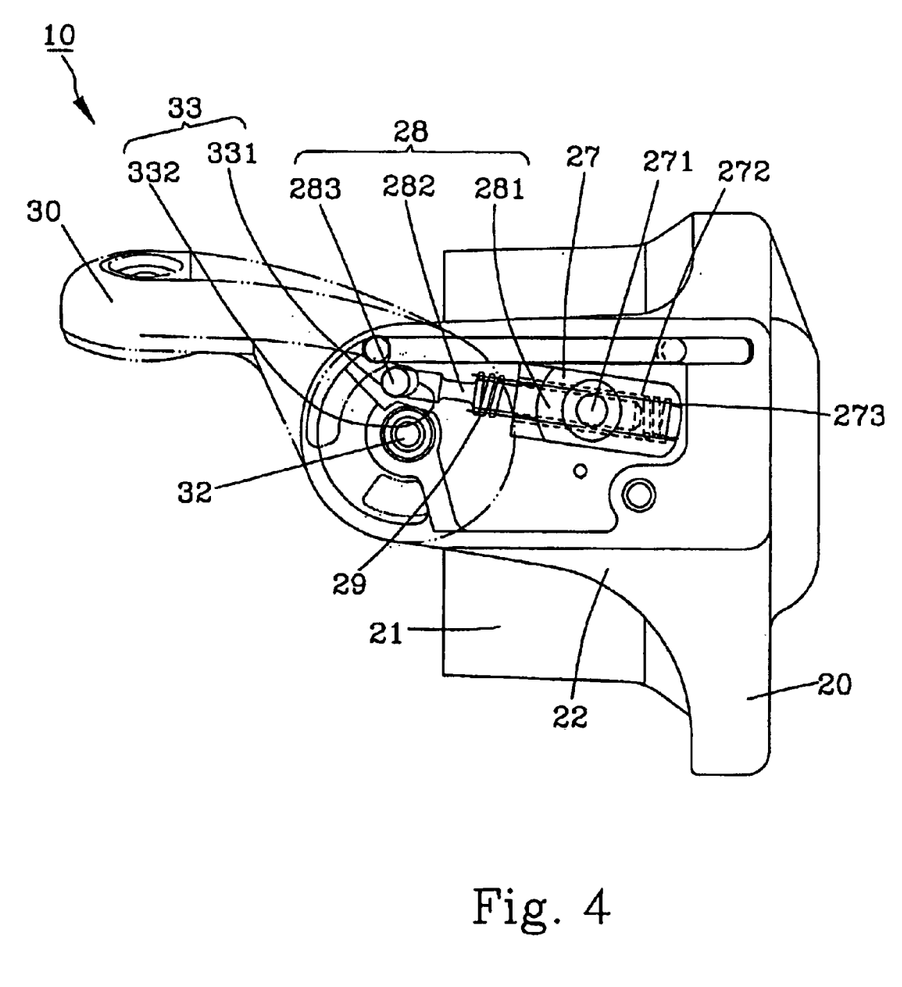
FIG. 4 is a first schematic view of the first preferred embodiment of the present invention at work.

Referring to FIGS. 2–4, a reel shell 10 adapted for mounting on a reel body of a spinning reel (not shown) and to be driven to rotate is provided by a first embodiment of the present invention. The reel shell 10 includes a base 20, a first bail arm 30, a second bail arm 40, and a bail 50.

The base 20 has a spool holder 21 connected with the reel body of the spinning reel (not shown), a first support arm 22 extending outwardly from a first side 211 of the spool holder 21, a second support arm 23 extending outwardly from a second side 212 of the spool holder 21. The first support arm 22 has a main body 24 extending outwardly from the first side 211 of the spool holder 21 and a cover 25 mounted on the main body 24 by means of a screw 251, such that a chamber 26, which is provided with an opening 261, is defined between the main body 24 and the cover 25. Therefore, the first support arm 22 has the chamber 26 inside and the opening 261, which communicates with the chamber 26 and the outside.

The first bail arm 30 is pivotally connected at a first end thereof with the first support arm 22 by a first pivot shaft 32 and seals the opening 261. The first bail arm has an elongated recess 33 at an inner side thereof. The direction of a longitudinal axle of the elongated recess 33 is preferably perpendicular to the direction of the line connected between said first pivot shaft 32 and said elongated recess 33, that is, the direction of the longitudinal axle of the elongated recess 33 is preferably tangent to a circle which has a center of the axis of the first pivot shaft 32. The first bail arm 30 is disposed with a line guide roller 35 at a second end 34 thereof The second bail arm 40 is pivotally connected with the second support arm 23 by a second pivot shaft 42 at a first end 41 thereof.

The bail 50 is semiannular and has two ends respectively connected with the line guide roller 35 of the first bail arm 30 and a second end 44 of the second bail arm 40. In other words, the bail 50 is connected with the first bail arm 30 via the line guide roller 35.

Accordingly, when the first bail arm 30 and the second bail arm 40 pivot respectively about the first pivot shaft 32 and the second pivot shaft 42, the bail 50 will pivot with respect to the base 20 and change its position. The foregoing function is well known to people who are familiar with the art such that the details will not be described hereafter.

Additionally, the chamber 26 of the first support arm 22 of the base 20 is further installed with a swing member 27, a connecting rod 28, and a spring 29.

The main body 24 of the first support arm 22 is provided with a first pivot hole 241 thereon. The cover 25 is provided with a second pivot hole 252 thereon. The swing member 27 is elongated tubular and is bilaterally respectively provided with a post 271 for inserted into the first pivot hole 241 and the second pivot hole 252, such that the swing member 27 is pivotally connected with the first support arm 22 and can be turned left and right. The swing member 27 is centrally provided with an axle hole 272, which is provided with a stop portion 273 with a smaller diameter at an end thereof.

The connecting rod 28 is composed of a body portion 281 inserted into the axle hole 272 of the swing member 27, a waist portion 282 positioned at a central section of the body portion 281, and an arm portion 283 laterally extending outwardly from a distal end of the body portion 281 and inserted into the elongated recess 33 of the first bail arm 30. A longitudinal length of the elongated recess 33 is longer than a diameter of the arm portion 283 of the connecting rod 28, such that the connecting rod 28 can move in the elongated recess 33.

The spring 29 is sleeved onto the body portion 281 of the connecting rod 28 and is positioned in the axle hole 272 of the swing member 27. The spring 29 has two ends respectively resting against the stop portion 273 of the swing member 27 and the waist portion 282 of the connecting rod 28.

Figure 5:
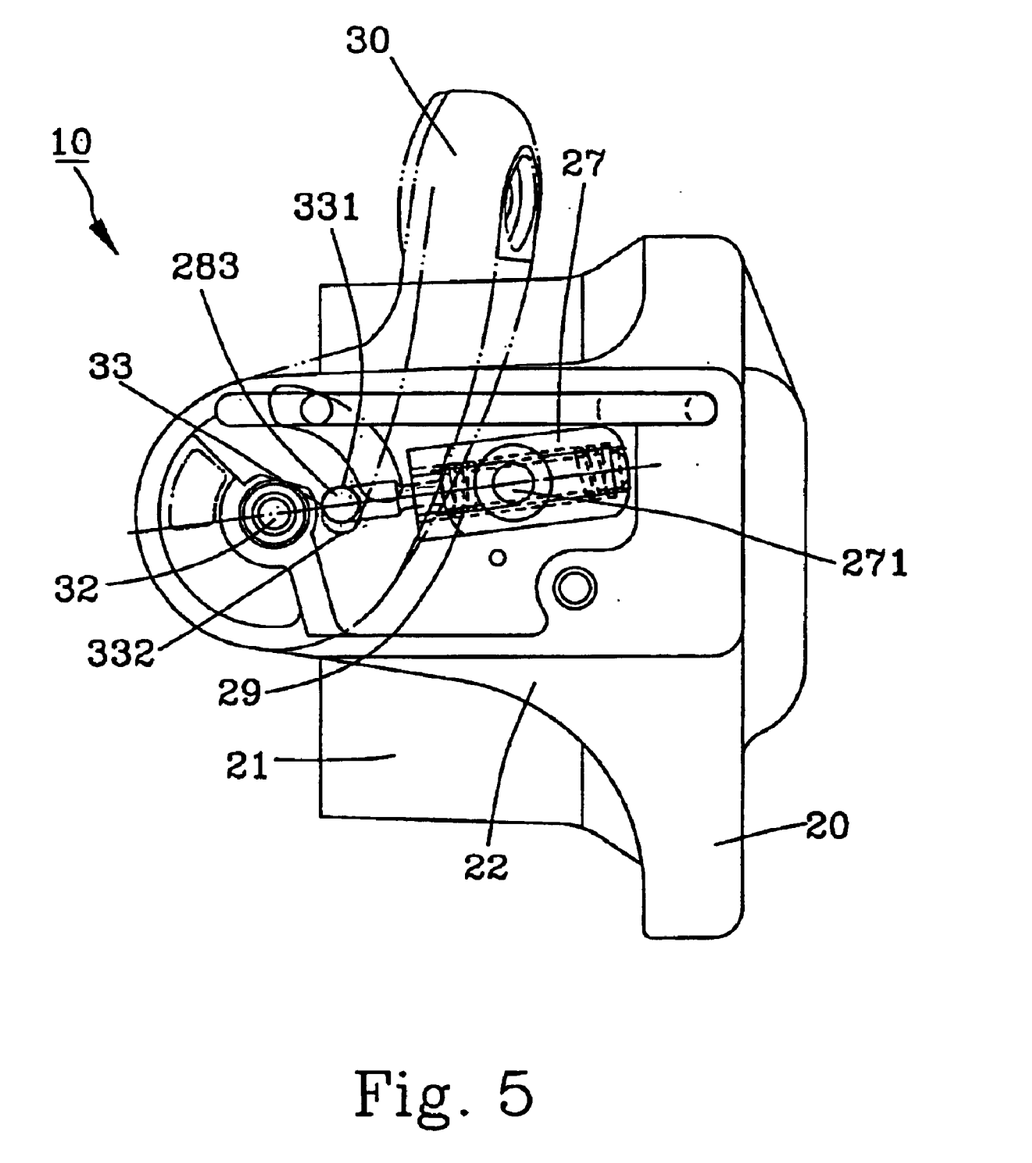
FIG. 5 is a second schematic view of the first preferred embodiment of the present invention at work.
Figure 6:
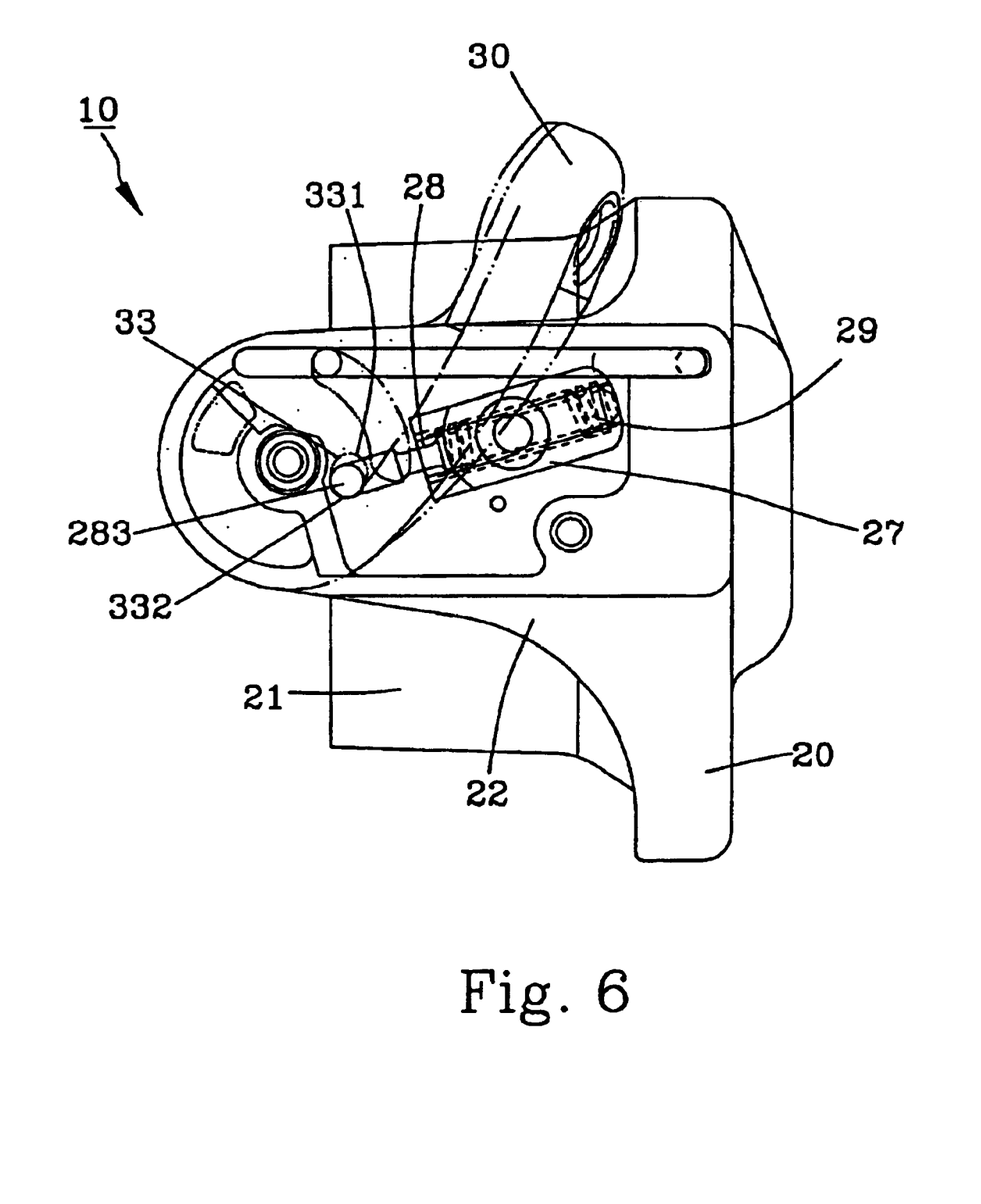
FIG. 6 is a third schematic view of the first preferred embodiment of the present invention at work.

The process of the bail 50 pivoting with respect to the base 20 is shown in FIGS. 4–6 and is described hereunder. When the first bail arm 30 is substantially parallel to the first support arm 22, the connecting rod 28 is elastically exerted by the spring 29 and the arm portion 283 of the connecting rod 28 rests against a first end 331 of the elongated recess 33, as shown in FIG. 4, such that the bail 50 can maintain in a predetermined position while no external force is exerted on the bail 50. When a user turns the bail 50, the first bail arm 30 will pivot clockwise and the connecting rod 28 overcomes the resilience of the spring 29 by contacting against the elongated recess 33 to move toward the swing member 27. In the meantime, the swing member 27 is pivotally mounted to the first support arm 22 via the posts 271 such that the swing member 27 will pivot counterclockwise. When the first bail arm 30 is turned to a critical position, as shown in FIG. 5, the direction of a longitudinal axle of the connecting rod 28 extends through the first pivot shaft 32. Meanwhile, the arm portion 283 of the connecting rod 28 still rests against the first end 331 of the elongated recess 33. When the first bail arm 30 is turned clockwise once more at a small angle, the arm portion 283 of the: connecting rod 28 is resiliently exerted by the spring 29 to move quickly toward a second end 332 of the elongated recess 33 and to impact the second end 332 of the elongated recess 33. While impacting the elongated recess 33, a clicking sound will be made and an impacting force will drive the first bail arm 30 to turn clockwise to the predetermined position, such that the bail 50 is precisely positioned. In the same way, when the bail 50 is turned counterclockwise with respect to the base 20 and passes by the critical position, the arm portion 283 moves from the second end 332 to the first end 331 of the elongated recess 33. Meanwhile, the arm portion 283 impacts the first end 331 and a clicking sound is made and the spring 29 resiliently drives the bail 50 to continuously turn counterclockwise to the predetermined position.

It is to be clarified that the swing member 27, the connecting rod 28 and the spring 29 of the preferred embodiment of the present invention are mounted on the first support arm 22. The second bail arm 40 will pivot along with the bail 50 by controlling the first bail arm 30. According to the objective of the present invention, the aforementioned components can be alternatively mounted on the second support arm 23. A second preferred embodiment of the present invention is described hereunder.

Figure 7:
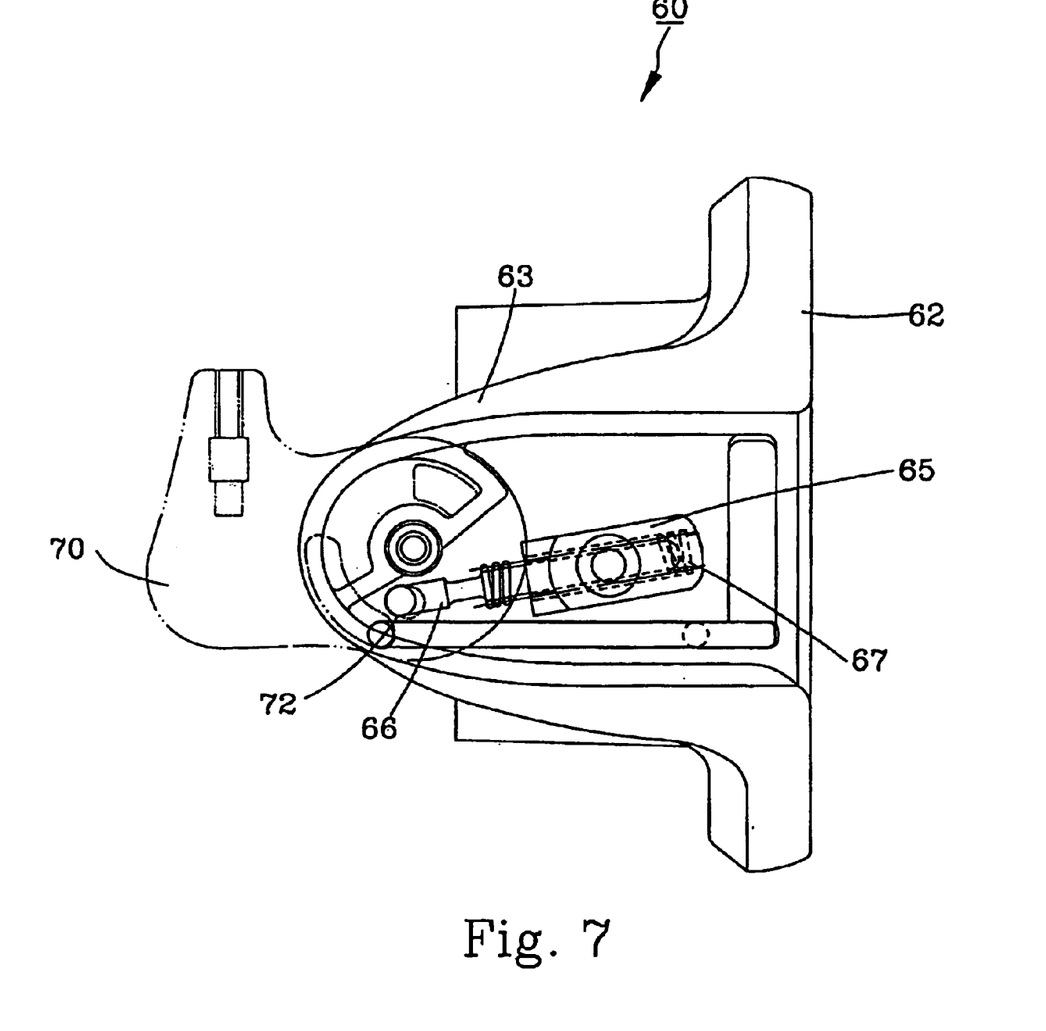
FIG. 7 is a first schematic view of a second preferred embodiment of the present invention at work.
Figure 8:
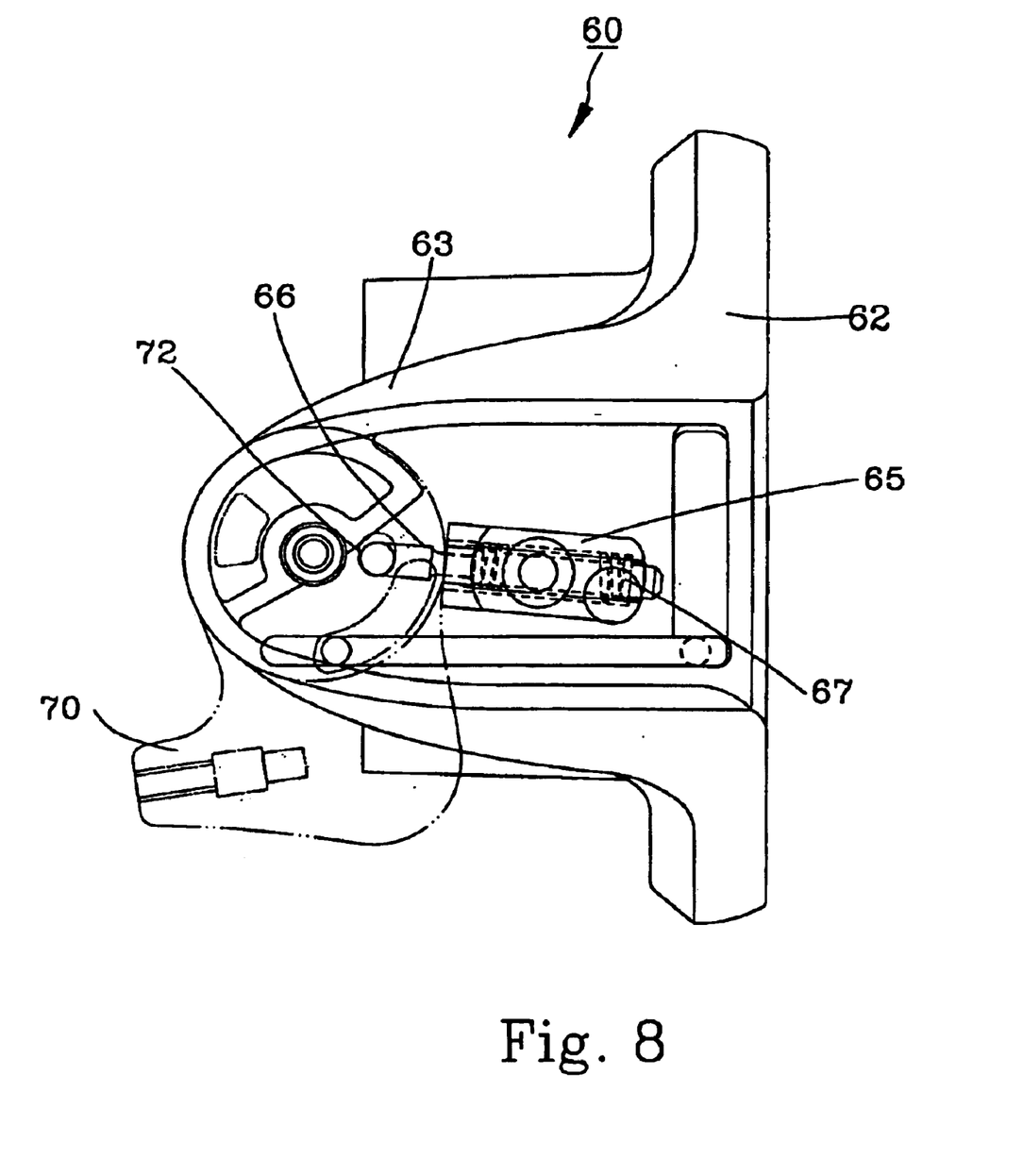
FIG. 8 is a second schematic view of the second preferred embodiment of the present invention at work.
Figure 9:
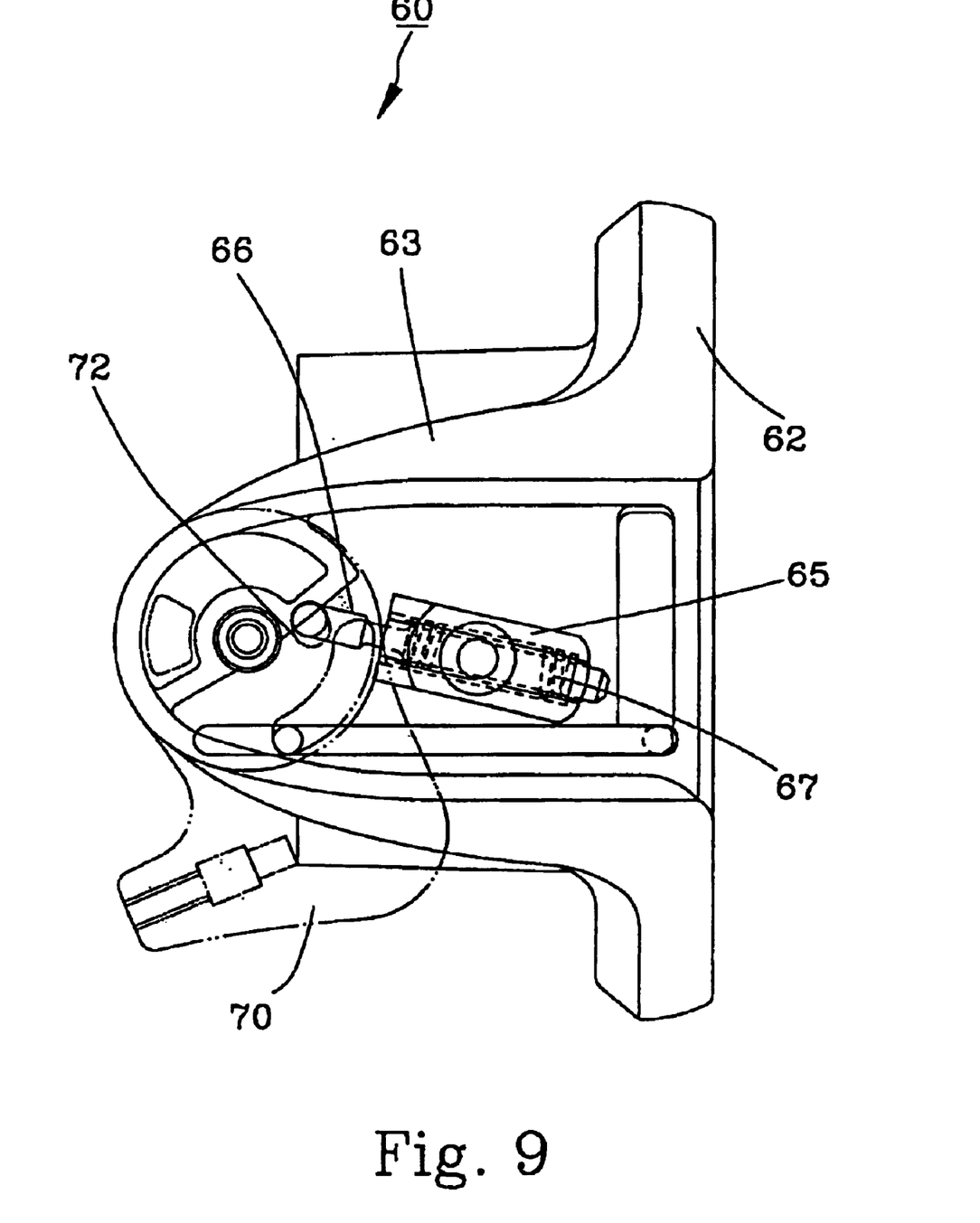
FIG. 9 is a third schematic view of the second preferred embodiment of the present invention at work.

Referring to FIGS. 7–9, the reel shell 60 provided by the second embodiment of the present invention is basically structurally the same with the first embodiment and is also composed of the base 62, the first bail arm (not shown), the second bail arm 70, and a bail (not shown). The difference from the first embodiment lies in that the swing member 65, connecting rod 66 and the spring 67 are mounted on the second support arm 63 of the base 62 and the elongated recess 72 is positioned at an inner side of the second bail arm 70 for inserted by an end of the connecting rod 66. By controlling the second bail arm 70, the bail 50 pivots along with the first bail arm and a clicking sound will be made while turned to the predetermined position, such that the bail 50 is precisely positioned.

Figure 10:
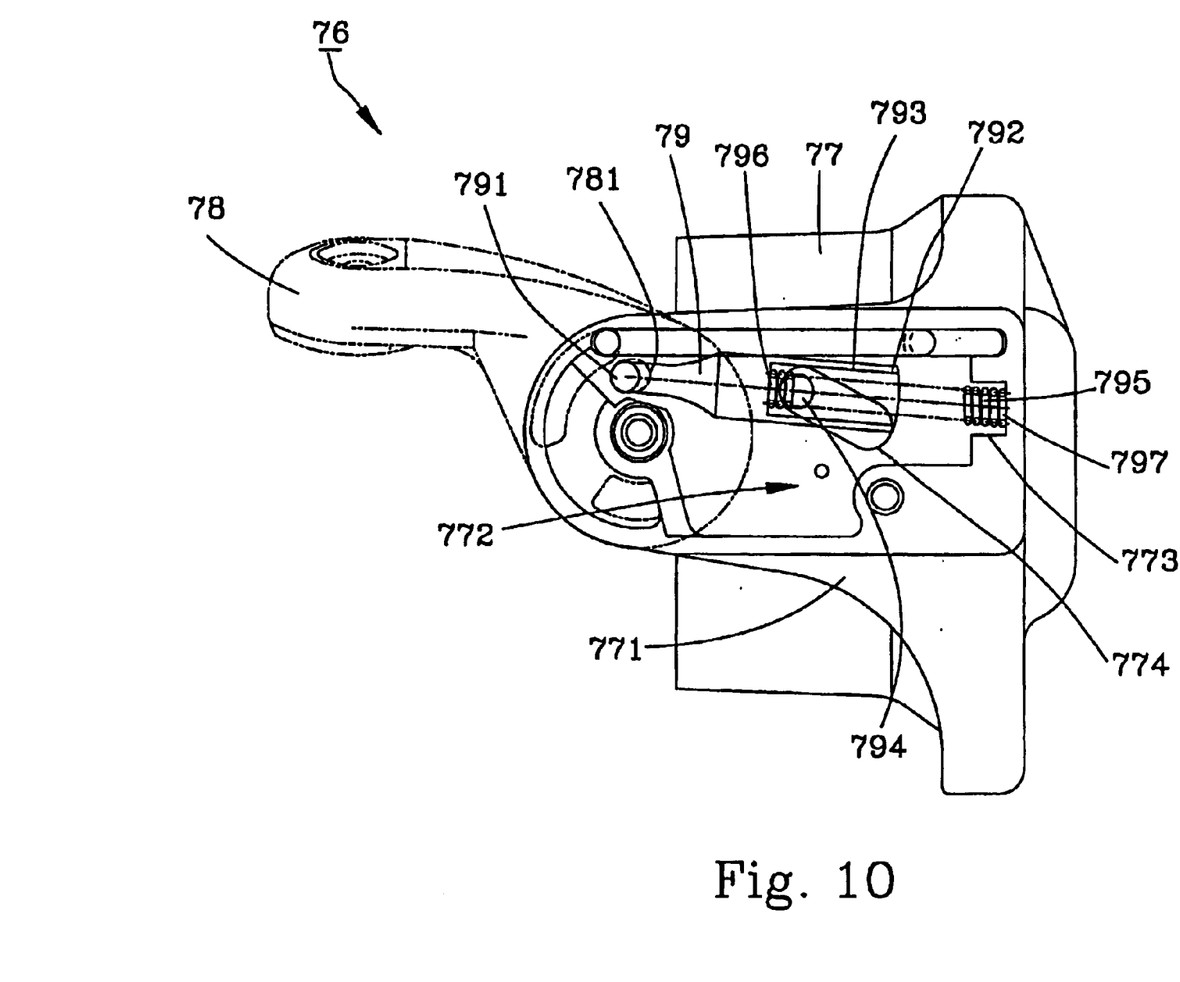
FIG. 10 is a first schematic view of a third preferred embodiment of the present invention at work.
Figure 11:
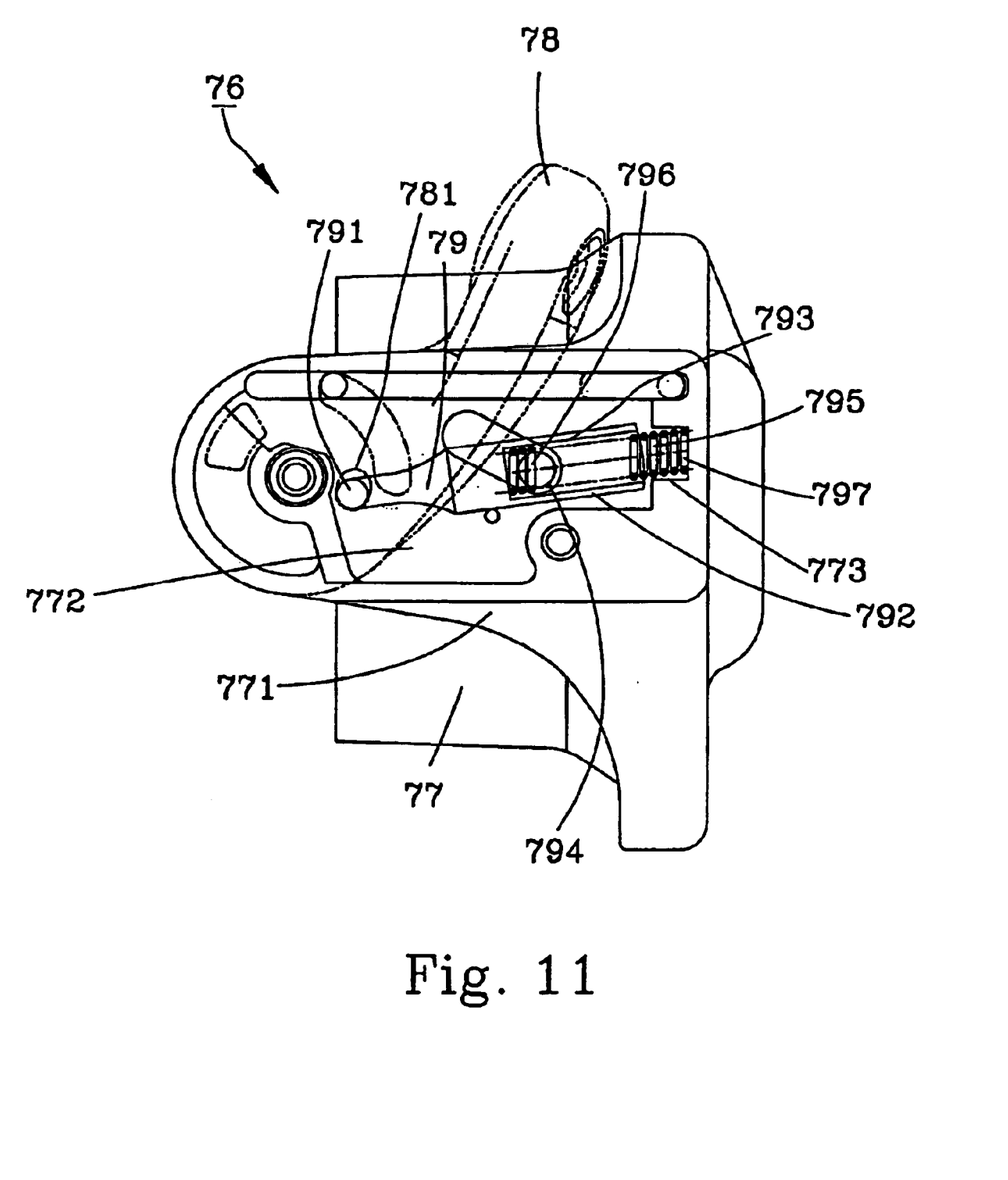
FIG. 11 is a second schematic view of the third preferred embodiment of the present invention at work.

Alternatively, as shown in FIGS. 10–11, the reel shell 76 of a third preferred embodiment of the present invention can be further structurally more simplified than the foregoing embodiments. The reel shell 76 is also composed of the base 77, the first bail arm 78, the second bail arm (not shown), and the bail (not shown). The difference from the first embodiment lies in that the chamber 772 of the first support arm 771 of the base 77 is only disposed with a connecting rod 79 and a spring 795. The connecting rod 79 has a first end 791 inserted into the elongated recess 781 of the first bail arm 78 and a second end 792 provided with a recessed portion 793 for inserted by a first end 796 of the spring 795. A second end 797 of the spring 795 contacts against an inner surface of the chamber 772 of the first support arm 771 and is positioned in a recession 773 of the chamber 772 of the first support arm 771. Accordingly, while the first bail arm 78 pivots, the spring 795 deforms and resiliently drives the first end 791 of the connecting rod 79 to move in the elongated recess 781 of the first bail arm 78 and to impact to make a clicking sound. To drive the connecting rod 79 to move, the connecting rod 79 is alternatively provided with a post 794 laterally protruded therefrom for inserted into a guide recess 774 of the chamber 772 of the first support arm 771.

Figure 12:
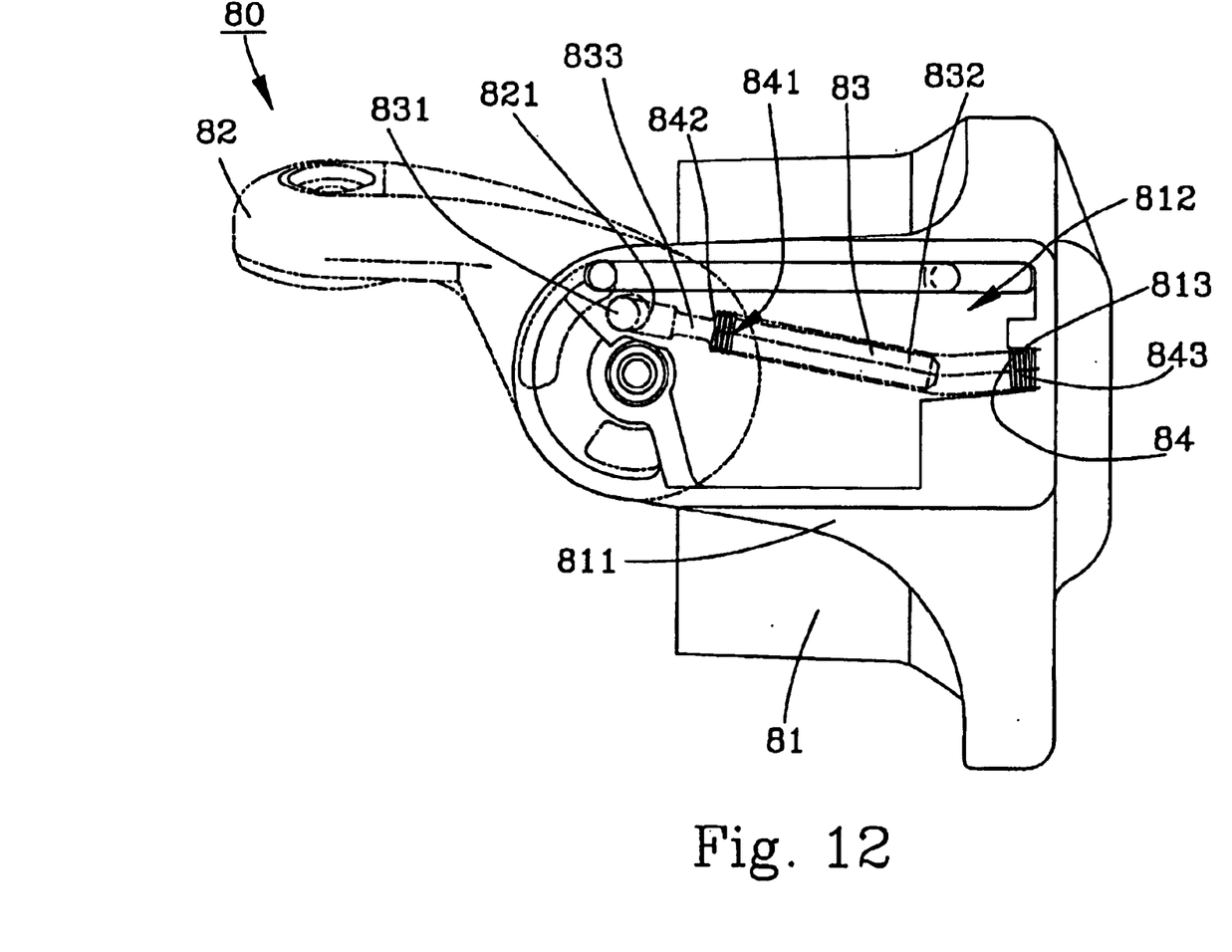
FIG. 12 is a first schematic view of a fourth preferred embodiment of the present invention at work.
Figure 13:
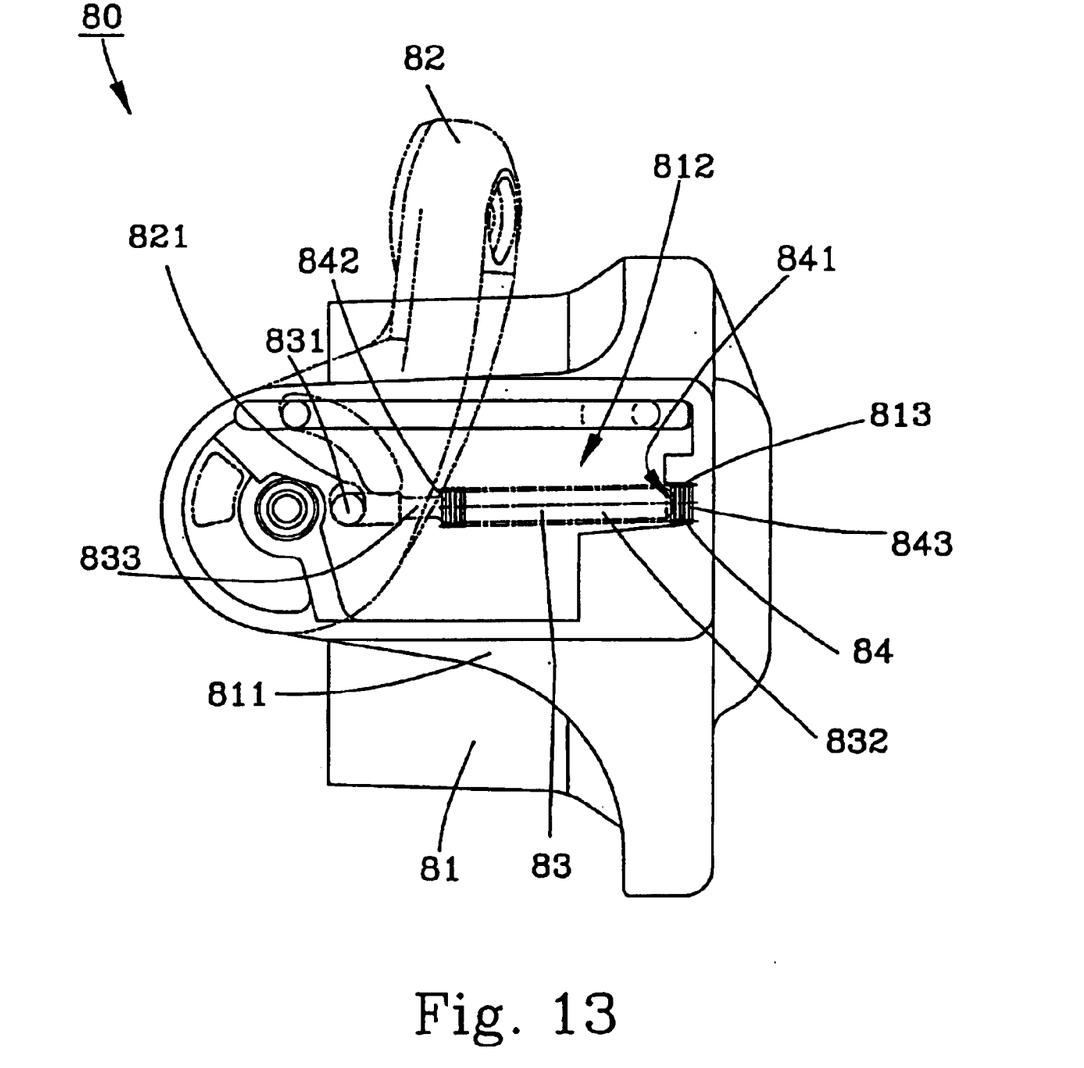
FIG. 13 is a second schematic view of the fourth second preferred embodiment of the present invention at work.

Alternatively, as shown in FIGS. 12–13, the reel shell 80 of a fourth embodiment of the present invention is basically structurally the same with third embodiment and is composed of the base 81, the first bail arm 82, the second bail arm (not shown), and the bail (not shown). The difference from the third embodiment lies in that the chamber 812 of the first support arm 811 of the base 81 is installed with a connecting rod 83 and a spring 84, wherein the connecting rod 83 has a first end 831 inserted into the elongated recess 821 of the first bail arm 82 and a second end 832 inserted into an axle hole 841 of the spring 84. The connecting rod 83 further includes a waist portion 833 for a first end 842 of the spring 84 contacting against. The spring 84 has a second end 843 contacting against the recession 813 of the chamber 812 of the first support arm 811. Accordingly, while the first bail arm 82 pivots, the spring 84 deforms and resiliently drives the first end 831 of the connecting rod 83 to move in the elongated recess 821 of the first bail arm 82 and to impact to make a clicking sound.

Figure 14:
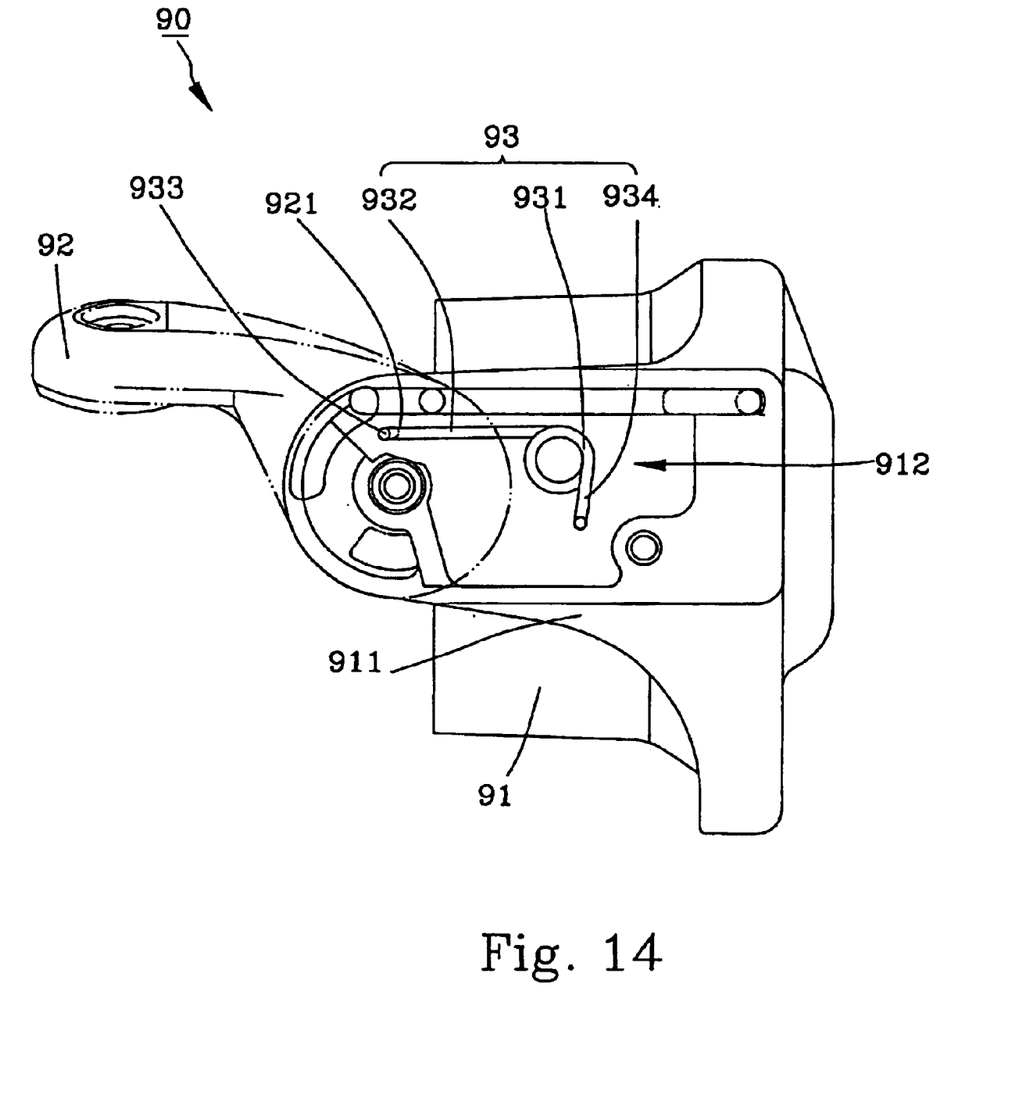
FIG. 14 is a first schematic view of a fifth preferred embodiment of the present invention at work.
Figure 15:
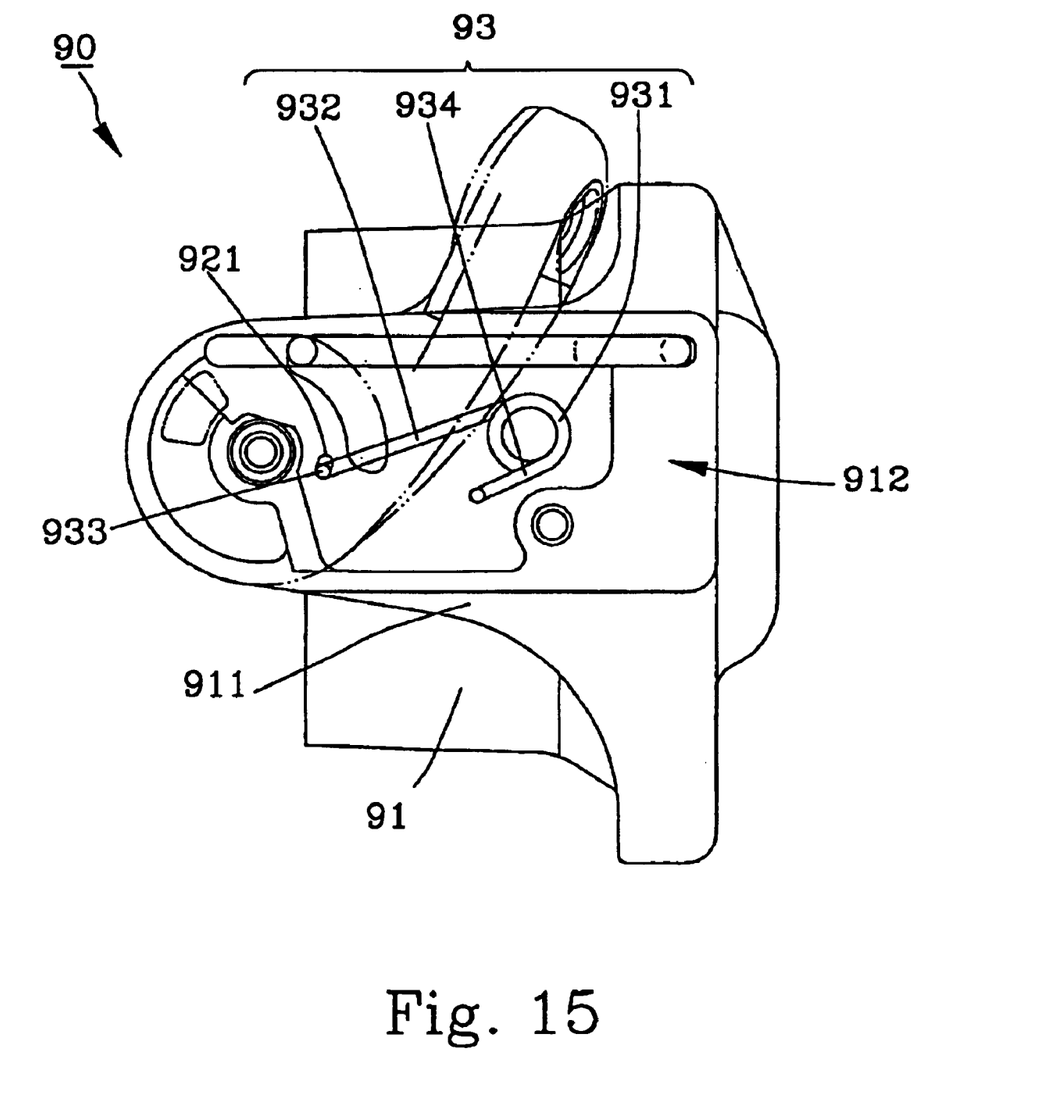
FIG. 15 is a second schematic view of the fifth preferred embodiment of the present invention at work.

Alternatively, as shown in FIGS. 14–15, the reel shell 90 of a fifth preferred embodiment of the present invention can be further structurally more simplified than the foregoing embodiments. The reel shell 90 is also composed of the base 91, the first bail arm 92, the second bail arm (not shown), and the bail (not shown). The difference from the foregoing embodiments lies in that the chamber 912 of the first support arm 911 of the base 91 is installed with a torsion spring 93, which includes a spiral portion 931, a first arm 932 extending outwardly from the spiral portion 931, and a second arm 934 extending outwardly from the spiral portion 931. The first arm 932 is inserted into the elongated recess 921 of the first bail arm 92 at a distal end 933 thereof. The second arm 934 is fastened at an inner surface of the chamber 912 of the first support arm 911 Accordingly, while the first bail arm 92 pivots, the torsion spring 93 deforms and resiliently drives the distal end 933 of the first arm 932 to move in the elongated recess 921 and to impact to make a clicking sound.

What is claimed is:

1. A clicking reel shell adapted for mounting on a reel body of a spinning reel and to be driven to rotate, said clicking reel shell comprising:

a base having a spool holder connected with said reel body of said spinning reel, a first support arm extending outwardly from a first side of said spool holder and being provided with a chamber inside and an opening at a free end of said chamber, and a second support arm extending outwardly from a second side of said spool holder;

a first bail arm pivotally connected to said first support arm at a first end thereof and sealing said opening, said first bail arm having an elongated recess at an inner side thereof;

a second bail arm pivotally connected to said second support arm at a first end thereof;

a bail having two ends respectively connected with a second end of said first bail arm and a second end of said second bail arm;

a swing member pivotally connected to said first support arm and centrally having an axle hole, said axle hole having a stop portion at one end thereof;

a connecting rod having a body portion inserted into said axle hole of said swing member, a waist portion positioned at a central section of said body portion, and an arm portion laterally extending from a distal end of said body portion, a free end of said arm portion being inserted into said elongated recess of said first bail arm;

a spring sleeved onto said body portion of said connecting rod and positioned in said axle hole of said swing member, said spring having two ends respectively contacting against said stop portion of said swing member and said waist portion of said connecting rod, and wherein when said bail is rotated said swing member rotates in an opposite direction and produces a clicking sound when said free end of the arm portion strikes an end of the elongated recess.

2. The reel shell as defined in claim 1, wherein said first support arm comprises a main body extending outwardly from the first side of said spool holder and a cover mounted on said main body such that said chamber is defined between said main body and said cover.

3. The reel shell as defined in claim 2, wherein said main body of said first support arm is provided with a first pivot hole thereon, said cover is provided with a second pivot hole thereon, and said swing member is bilaterally respectively provided with a post, said two posts being respectively coupled with said first pivot hole and said second pivot hole, such that said swing member is pivotally connected with said first support arm.

4. The reel shell as defined in claim 1, wherein said first bail arm is pivotally connected with said first support arm by means of a first pivot shaft.

5. The reel shell as defined in claim 1, wherein said first bail arm is disposed with a line guide roller at the second end thereof such that said bail is pivotally connected with said first bail arm by means of said line guide roller.

6. The reel shell as defined in claim 1, wherein said second bail arm is disposed with a line guide roller at the second end thereof such that said bail is pivotally connected with said second bail arm via said line guide roller.

7. A clicking reel shell adapted for mounting on a reel body of a spinning reel and to be driven to rotate, said clicking reel shell comprising:

a base having a spool holder connected with said reel body of said spinning reel, a first support arm extending outwardly from a first side of said spool holder and being provided with a chamber inside thereof and an opening at a free end of said chamber, and a second support arm extending outwardly from a second side of said spool holder;

a first bail arm pivotally connected to said first support arm at a first end thereof and sealing said opening, said first bail arm having an elongated recess at an inner side thereof;

a second bail arm pivotally connected to said second support arm at a first end thereof;

a bail having two ends respectively connected with a second end of said first bail arm and a second end of said second bail arm;

a connecting rod having a free first end inserted into said elongated recess of said first bail arm and a second end with a recessed portion, wherein a first end of a spring is engaged in said recessed portion, said spring contacting against an inner surface of said chamber of said first support arm at a second end thereof, and and wherein when said bail is rotated said swing member rotates in an opposite direction and produces a clicking sound when said first end of the connecting rod strikes an end of the elongated recess.

8. The reel shell as defined in claim 7, wherein said first support arm comprises a main body extending outwardly from the first side of said spool holder and a cover mounted on said main body such that said chamber is defined between said main body and said cover.

9. The reel shell as defined in claim 7, wherein said first bail arm is pivotally connected with said first support arm by means of a first pivot shaft.

10. The reel shell as defined in claim 7, wherein said spring has the second end received in a recession of said chamber of said first support arm.

11. A clicking reel shell adapted for mounting on a reel body of a spinning reel and to be driven to rotate, said clicking reel shell comprising:

a base having a spool holder connected with said reel body of said spinning reel, a first support arm extending outwardly from a first side of said spool holder and being provided with a chamber inside thereof and an opening at a free end of said chamber, and a second support arm extending outwardly from a second side of said spool holder;

a first bail arm pivotally connected to said first support arm at a first end thereof and sealing said opening, said first bail arm having an elongated recess at an inner side thereof;

a second bail arm pivotally connected to said second support arm at a first end thereof;

a bail having two ends respectively connected with a second end of said first bail arm and a second end of said second bail arm; and a connecting rod having a free first end inserted into said elongated recess of said first bail arm, wherein said connecting rod is inserted into an axle hole of said spring at the second end thereof and further comprises a waist portion for the first end of said spring to contact against, and wherein when said bail is rotated said swing member rotates in an opposite direction and produces a clicking sound when said free first end of the connecting rod strikes an end of the elongated recess.

12. The reel shell as defined in claim 7, wherein said connecting rod is provided with a recessed portion at the second end thereof for insertion of the first end of said spring.

* * * * *